Figure 1:
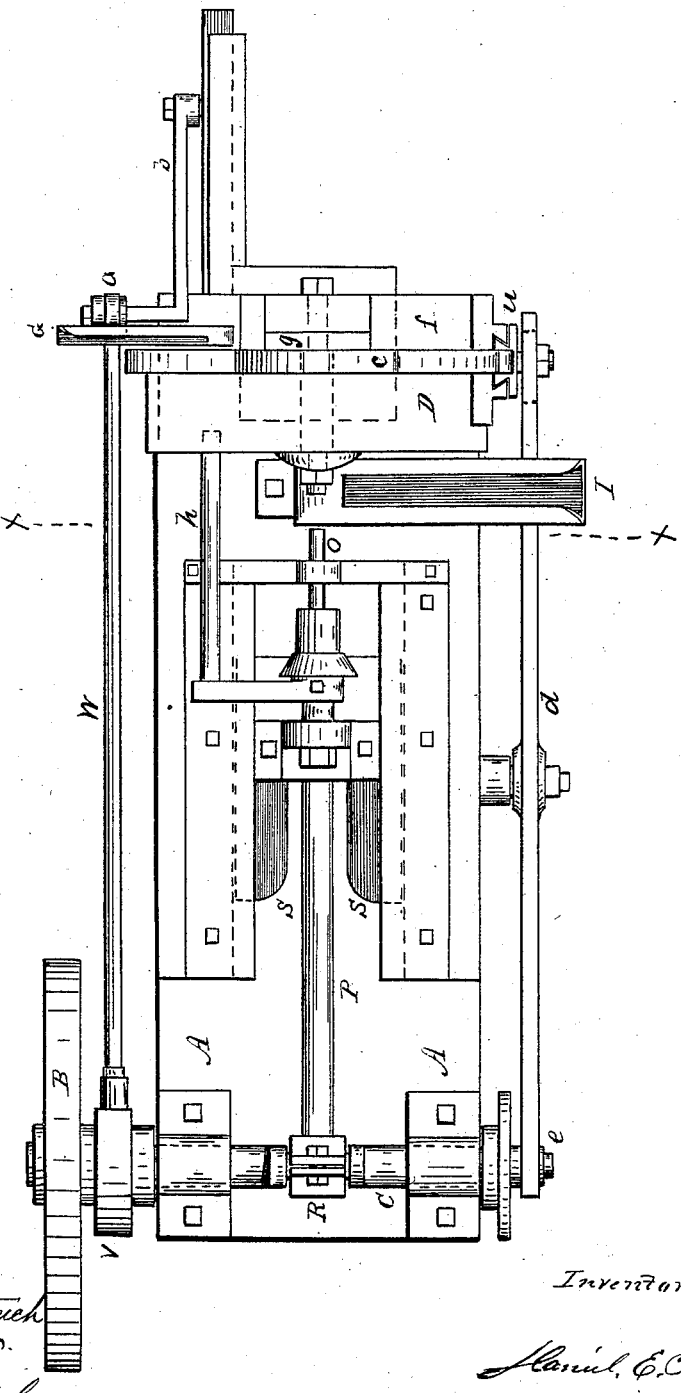

(No Model.)  3 Sheets—Sheet 1.

D. E. POWERS.
Cartridge Machine.

No. 240,537.  Patented April 26, 1881.

Witnesses
Fred G. Dieterich
P. H. Dieterich

Inventor
Daniel E. Powers

N. PETERS, PHOTO-LITHOGRAPHER, WASHINGTON, D. C.

(No Model.) 3 Sheets—Sheet 2.
D. E. POWERS.
Cartridge Machine.
No. 240,537. Patented April 26, 1881.
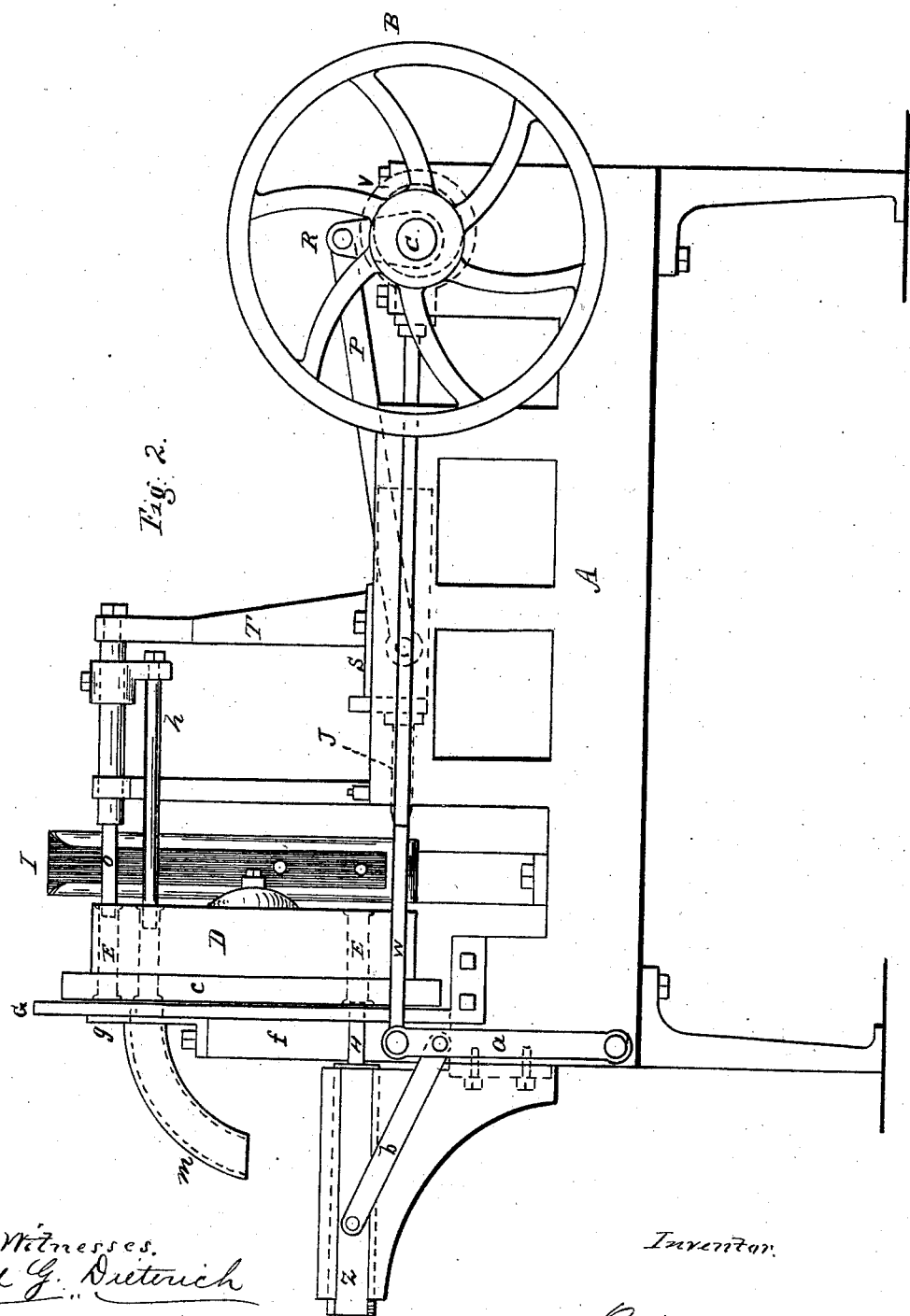

(No Model.) 3 Sheets—Sheet 3.
D. E. POWERS.
Cartridge Machine.
No. 240,537. Patented April 26, 1881.
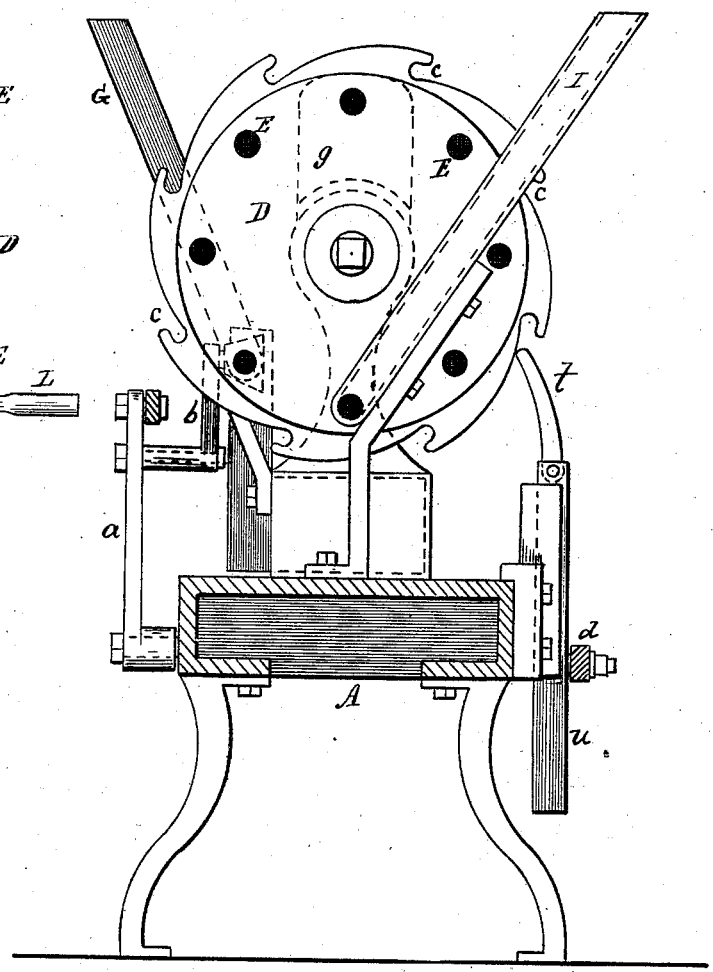
Fig. 4.
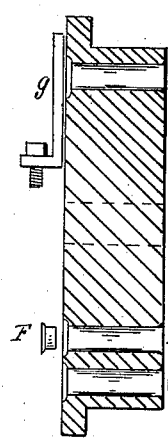
Fig. 3.
Fig. 5.
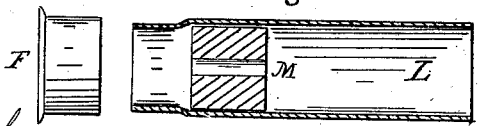
Fig. 6.
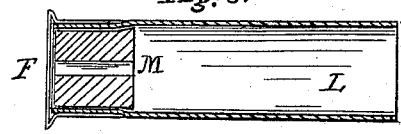
Witnesses.
Fred G. Dieterich
P. H. Dieterich
Inventor
Daniel E. Powers

UNITED STATES PATENT OFFICE.

DANIEL E. POWERS, OF NEW YORK, ASSIGNOR TO STEPHEN W. WOOD, OF CORNWALL, N. Y.

CARTRIDGE-MACHINE.

SPECIFICATION forming part of Letters Patent No. 240,537, dated April 26, 1881.

Application filed February 21, 1881. (No model.)

*To all whom it may concern:*

Be it known that I, DANIEL E. POWERS, of the city, county, and State of New York, have invented new and useful Improvements in Machines for Assembling the Bodies and Heads for Shells for Cartridges; and I do hereby declare that the following is a full, clear, and exact description thereof, reference being had to the accompanying drawings, making part of this specification.

Figure 1 represents a plan thereof; Fig. 2, a side elevation; Fig. 3, a vertical cross-section through the line $x\,x$ of Fig. 1; Fig. 4, detached section of the recessed wheel for receiving and holding the heads and bodies while being put together; Fig. 5, enlarged view of the several parts of a shell in position to be assembled; Fig. 6, longitudinal section of a shell for a cartridge assembled and in readiness to be swaged together.

My invention relates to a machine for assembling the bodies and heads in the manufacture of shells for cartridges.

Like letters indicate corresponding parts in all the figures.

Upon a suitable frame, A, are mounted the various operating parts for the purpose of assembling the heads and bodies of shells for cartridges; and it consists of a driving-pulley, B, and main driving-shaft C, placed at the rear end of the frame, through which wheel and shaft motion is imparted to the other moving mechanism.

D is an intermittent revolving wheel provided with a series of recesses, E, near its periphery, to receive the heads and bodies of the shells to be assembled or put together. The heads F are placed in a conveying-trough, G, and by their gravity present themselves, one after another, in front of the transferring-punch H, Fig. 2, to be transferred into the recesses on the front face of the wheel D, the recesses being shaped so as to receive and hold the heads in position to receive the reduced ends of the bodies, as represented in Figs. 4, 5. The bodies are placed in a similar inclined conveying-trough, I, and by their gravity they also present themselves, one after another, in front of the transferring-punch J, (dotted lines, Fig. 2,) to be transferred from the conveying-trough I into recesses E on the rear side of the wheel D, and one end thereof inserted into the heads F, previously transferred into the recesses E from the opposite side of the wheel D. Before the bodies L are placed in the assembling-machine to receive the heads F the wads M are inserted therein, and the ends to receive the heads F are reduced so that the heads may be easily placed thereon. These wads M are inserted into the bodies a distance from the reduced ends, (see Fig. 5,) so that the reduced ends may receive the heads, which are of the same exterior diameter as the bodies before being reduced, and after the reduced ends of the bodies are inserted into the heads by means of the transferring-punch J, the wads M are then forced down into the heads, also by the punch O, thereby placing the wads in position in the heads to be subsequently swaged to firmly unite the heads and bodies together.

By means of a connecting-rod, P, and crank R on the main driving-shaft C, a reciprocating movement is imparted to a sliding cross-head, S, Fig. 1, to which cross-head is fitted the transferring-punch, J, (dotted lines, Fig. 2,) for transferring the bodies consecutively, one after another, from the conveying-trough I into the recesses E in the wheel D, and to which is also secured the punch O for forcing the wads into the heads. To this driving-shaft C is also fitted an eccentric, V, and connecting-rod W, for the purpose of obtaining the required back-and-forth movement of the slide Z, carrying the transferring-punch H for transferring the heads from the conveying-trough G into the recesses in the front side of the wheel D consecutively one after another. The slide Z and transferring-punch H attached thereto are reciprocated back and forth by means of the connecting-rod W, rock-shaft $a$, and bar $b$, as represented in Figs. 1, 2, 3.

To obtain the requisite intermittent movement of the wheel D to receive the paper bodies one after another in the recesses E from the trough, an ordinary ratchet-wheel, $c$, and pawl $t$ are provided, the ratchet-wheel being formed on the enlarged rim of the wheel D, and the pawl $t$ pivoted to a slide, $u$, secured to the side of the frame A. The requisite up-and-down movement is given to the pawl to rotate the wheel D intermittently by means of a vibrating lever, d, and crank e on the main driving-shaft C, thus turning the wheel D intermittently, so as to present the recesses E therein consecutively, one after another, to the several punches in the operation of assembling the heads and bodies of shells.

To retain the heads in the recesses E while the ends of the bodies are being forced into them the face of the wheel D runs close to the inner face of the stud f secured to the frame A, against which stud the heads rest in the operation, and a plate, g, is bolted to the top of this stud f, against which the heads rest while the wads are being forced into them by the punch O. (See Figs. 1, 2, 4, and dotted lines, Fig. 3.) After the heads shall have received the bodies, and the wads shall have also been forced down into the heads, a removing-punch, h, attached to the stud T upon the cross-head S, is moved forward therewith, and, entering the recesses, forces the assembled shells therefrom through a conveying-spout, m, one after another, into a receptacle provided to receive them.

In assembling the heads and bodies of shells for cartridges by this mechanism the heads are first placed in the conveying-trough G and the bodies in the conveying-trough I. Motion is then given, through the driving-pulley and shaft C, to the various moving parts. By the ratchet-wheel and pawl the recessed wheel D is rotated intermittently to present the recesses E therein consecutively, one after another, to the transferring-punches, to receive the heads and bodies of the shells, and to the punch O for forcing the wads down to their seat in the heads, and to the ejecting-punch for removing the assembled shells from the recesses E.

The transferring-punch J, (dotted lines, Fig. 2,) for conveying the bodies, one after another, from the trough I into the recesses E, the punch O, to force the wads down into the heads, and the ejecting-punch h, for removing the assembled shells from the recesses E, so that the operation of assembling may be continuous, are all mounted upon and move back and forth with the movement of the cross-head S.

The transferring-punch H, to transfer the heads from the conveying-trough G, one after another, into the recesses E, moves alternately with the transferring-punch J, so that as the transferring-punch J recedes, after having transferred a body into one of the recesses E, the punch H moves forward and transfers a head from the trough G into the opposite end of a recess, E.

The backward movement of the cross-head S, carrying the transferring-punch J, is sufficient so that when it commences to move forward the pawl t may rotate the wheel D one notch and stop before an advancing body commences to enter an empty recess.

By these alternating movements of the operating parts the process of assembling the heads and bodies of shells for cartridges is continuous and rapid.

Having thus fully described my invention, what I claim therein as new, and desire to secure by Letters Patent, is—

1. A cartridge-carrying wheel arranged between two tubes or conveyers, one for the bodies, the other for the heads, in combination with a pair of transferring-punches arranged on opposite sides of said wheel, and connected by a crank and connecting-rod with the main driving-shaft, whereby the heads are transferred into the wheel from one side and the bodies from the other side thereof.

2. In a cartridge-assembling machine, the combination of a cartridge-carrying wheel, two tubes or conveyers arranged on opposite sides of said wheel, one for the bodies, the other for the heads, a pair of transferring-punches arranged on opposite sides of said wheel, and connected by crank and connecting-rod with the main driving-shaft, and a punch for seating the wad in the base of the shell, said punch also operated by the driving-shaft, substantially as herein set forth.

DANIEL E. POWERS.

Witnesses:
H. WIDMAYER,
JAMES PATTON.